(12) United States Patent
Basavaraja et al.

(10) Patent No.: US 12,255,778 B2
(45) Date of Patent: Mar. 18, 2025

(54) METHOD AND APPARATUS FOR DERIVING NETWORK CONFIGURATION AND STATE FOR PHYSICAL NETWORK FABRIC SIMULATION

(71) Applicant: NVIDIA Corporation, Santa Clara, CA (US)

(72) Inventors: Rohith Basavaraja, Bangalore (IN); Vinay Prasad V, Bangalore (IN); Sharath Ramamurthy, Bangalore (IN)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 18/164,972

(22) Filed: Feb. 6, 2023

(65) Prior Publication Data

US 2024/0214269 A1   Jun. 27, 2024

(30) Foreign Application Priority Data

Dec. 24, 2022   (IN) .............................. 202211075176

(51) Int. Cl.
*H04L 41/0853* (2022.01)
*H04L 41/0859* (2022.01)
*H04L 41/0869* (2022.01)

(52) U.S. Cl.
CPC ...... *H04L 41/0853* (2013.01); *H04L 41/0859* (2013.01); *H04L 41/0869* (2013.01)

(58) Field of Classification Search
CPC ............. H04L 41/0853; H04L 41/0859; H04L 41/0869; H04L 41/0803; H04L 41/40; H04L 41/122; H04L 43/20; H04L 41/14; H04L 41/0866; H04L 41/147; H04L 41/5009; H04L 41/145; H04L 41/0604; G06F 11/3457; G06F 11/3447
See application file for complete search history.

(56) References Cited

U.S. PATENT DOCUMENTS

| | | | | |
|---|---|---|---|---|
| 7,639,609 | B2 * | 12/2009 | Bolt | H04L 41/22 370/252 |
| 9,628,339 | B1 * | 4/2017 | Thai | H04L 67/01 |
| 10,700,958 | B2 * | 6/2020 | Flamini | H04L 41/12 |
| 10,749,759 | B2 * | 8/2020 | Clark | G06F 3/0482 |
| 10,756,970 | B1 * | 8/2020 | Hermoni | H04L 41/149 |
| 10,795,690 | B2 * | 10/2020 | Shinde | G06F 9/45558 |
| 10,833,935 | B2 * | 11/2020 | Moats | G06F 9/45558 |

(Continued)

*Primary Examiner* — Alex H. Tran
(74) *Attorney, Agent, or Firm* — Sheridan Ross P.C.

(57) ABSTRACT

Systems and methods are described for collecting configuration data associated with one or more devices of a network, in association with a configuration of the network. The systems and methods include validating the configuration of the network. Validating the configuration includes determining a stability status associated with the network and the configuration. The systems and methods include generating a data record corresponding to the configuration of the network and storing the data record to a data repository. The data record includes the configuration data and results associated with validating the configuration of the network. The systems and methods include generating a second configuration and simulating the second network based on the second configuration. The second configuration includes the one or more devices, one or more second devices included in the data repository, or both.

19 Claims, 8 Drawing Sheets

(56) References Cited

U.S. PATENT DOCUMENTS

| | | | |
|---|---|---|---|
| 11,507,487 B2* | 11/2022 | Chen | H04L 49/50 |
| 11,757,727 B2* | 9/2023 | Metaxas | H04L 41/16 |
| | | | 709/220 |
| 2008/0101419 A1* | 5/2008 | Suriyanarayanan | |
| | | | H04L 41/0869 |
| | | | 370/503 |
| 2014/0047079 A1* | 2/2014 | Breternitz | G06F 9/5072 |
| | | | 709/220 |
| 2021/0329004 A1* | 10/2021 | Xing | H04L 41/0873 |
| 2023/0133057 A1* | 5/2023 | Murthy | G06N 3/045 |
| | | | 709/220 |

* cited by examiner

METHOD AND APPARATUS FOR DERIVING NETWORK CONFIGURATION AND STATE FOR PHYSICAL NETWORK FABRIC SIMULATION

FIELD OF TECHNOLOGY

The present disclosure relates to network configurations, in particular, toward deriving network configurations and device states for simulating a physical network fabric.

BACKGROUND

A network fabric is a mesh network topology with virtual or physical network elements, forming a single fabric. Some network evaluation techniques include simulating a network fabric to evaluate design performance, prior to deployment of the network fabric in an actual environment. Improved techniques for determining a network configuration are desired.

SUMMARY

The described techniques relate to improved methods, systems, devices, and apparatuses that support deriving network configuration and state for physical network fabric simulation.

An apparatus includes: a processor; and memory in electronic communication with the processor. Instructions stored in the memory are executable by the processor to: collect configuration data associated with one or more devices of a network, in association with a configuration of the network; validate the configuration of the network, wherein validating the configuration includes determining a stability status associated with the network and the configuration; generate a data record corresponding to the configuration of the network and store the data record to a data repository, wherein the data record includes: the configuration data associated with the one or more devices; and results associated with validating the configuration of the network; generate a second configuration associated with simulating a second network, wherein the second configuration includes the one or more devices, one or more second devices included in the data repository, or both; and simulate the second network based on the second configuration.

Any of the aspects herein, wherein the instructions are further executable by the processor to: generate a tag indicating version information associated with the configuration, in response to determining the stability status associated with the network and the configuration.

Any of the aspects herein, wherein the instructions are further executable by the processor to: record stability information associated with the network and the configuration in response to determining the stability status associated with the network and the configuration.

Any of the aspects herein, wherein the instructions are further executable by the processor to: generate a stability score associated with the network and the configuration based on stability information recorded in association with the network and the configuration.

Any of the aspects herein, wherein the stability information includes: one or more stability parameters associated with the configuration; and one or more weighting factors associated with the one or more stability parameters.

Any of the aspects herein, wherein validating the configuration of the network is based on one or more stability parameters including at least one of: the results associated with validating the configuration of the network; an event log associated with the network, wherein the event log includes an indication of one or more events, one or more alarms, or both; a system log associated with the network; an application log associated the one or more devices; a data packet log associated with the network, wherein the data packet log includes an indication of a quantity of data packet drops, a frequency of data packet drops, or both; and environmental data associated with the one or more devices.

Any of the aspects herein, wherein the instructions are further executable by the processor to: collect environmental data associated with the one or more devices, in association with the configuration of the network, wherein the data record includes the environmental data.

Any of the aspects herein, wherein the environmental data includes at least one of: temperature information associated with the one or more devices; memory resources associated with the one or more devices; and sensor data associated with the one or more devices.

Any of the aspects herein, wherein the instructions are further executable by the processor to: assign a classification to the network and the configuration based on a comparison of a stability score associated with the network and the configuration and a threshold stability score, wherein the classification includes an indication of the network and the configuration as stable or unstable.

Any of the aspects herein, wherein the instructions are further executable by the processor to, in response to a comparison result in which a stability score associated with the network and the configuration is less than a threshold stability score: assign a classification to the network and the configuration, wherein the classification includes an indication of the network and the configuration as unstable; and add, to the data record, an indication of one or more failure events associated with the network and the configuration.

Any of the aspects herein, wherein the data record includes at least one of: the configuration data associated with the one or more devices; environmental data associated with the one or more devices; a configuration tag including version information of the configuration of the network; a stability score associated with the network and the configuration; a classification associated with the network and the configuration; and temporal information associated with the data record.

Any of the aspects herein, wherein the data repository includes: one or more candidate configurations, wherein each of the candidate configurations includes a network topology; and a set of data records for generating the one or more candidate configurations.

Any of the aspects herein, wherein the instructions are further executable by the processor to: receive a request for generating the second configuration, wherein the request includes one or more target simulation parameters, wherein generating the second configuration is in response to receiving the request.

Any of the aspects herein, wherein the one or more target simulation parameters include at least one of: a target topology associated with the second network; a target use case associated with the second network; and a target stability score associated with the second network.

Any of the aspects herein, wherein the one or more target simulation parameters include an extrapolation indicator associated with extrapolating at least one of: a target topology associated with the second network; and a target use case associated with the second network.

Any of the aspects herein, wherein generating the second configuration is based on comparing one or more simulation parameters associated with the second configuration to the one or more target simulation parameters.

Any of the aspects herein, wherein generating the second configuration includes extrapolating a topology of the second network configuration based on an extrapolation indicator included in the one or more target simulation parameters.

Any of the aspects herein, wherein at least one of collecting the configuration data, validating the configuration of the network, and generating the data record is performed in real-time.

A system includes one or more circuits to: collect configuration data associated with one or more devices of a network, in association with a configuration of the network; validate the configuration of the network, wherein validating the configuration includes determining a stability status associated with the network and the configuration; generate a data record corresponding to the configuration of the network and store the data record to a data repository of candidate devices and candidate configurations, wherein the data record includes: the configuration data associated with the one or more devices; and results associated with validating the configuration of the network; generate a second configuration associated with simulating a second network, wherein the second configuration includes the one or more devices, one or more second devices included in the data repository, or both; and simulate the second network based on the second configuration.

A method of generating a configuration for a simulated network fabric, including: collecting configuration data associated with one or more devices of a network fabric, in association with a configuration of the network; validating the configuration of the network fabric, wherein validating the configuration includes determining a stability status associated with the network fabric and the configuration; generating a data record corresponding to the configuration of the network fabric, wherein the data record includes: the configuration data associated with the one or more devices; and results associated with validating the configuration of the network; generating a second configuration associated with the simulated network fabric, in response to a request for generating the second configuration, wherein the second configuration includes the one or more devices, one or more second devices, or both; and validating the simulated network fabric based on a result of comparing a stability score associated with the simulated network fabric and the second configuration to a threshold stability score.

DETAILED DESCRIPTION

Figure 1A:
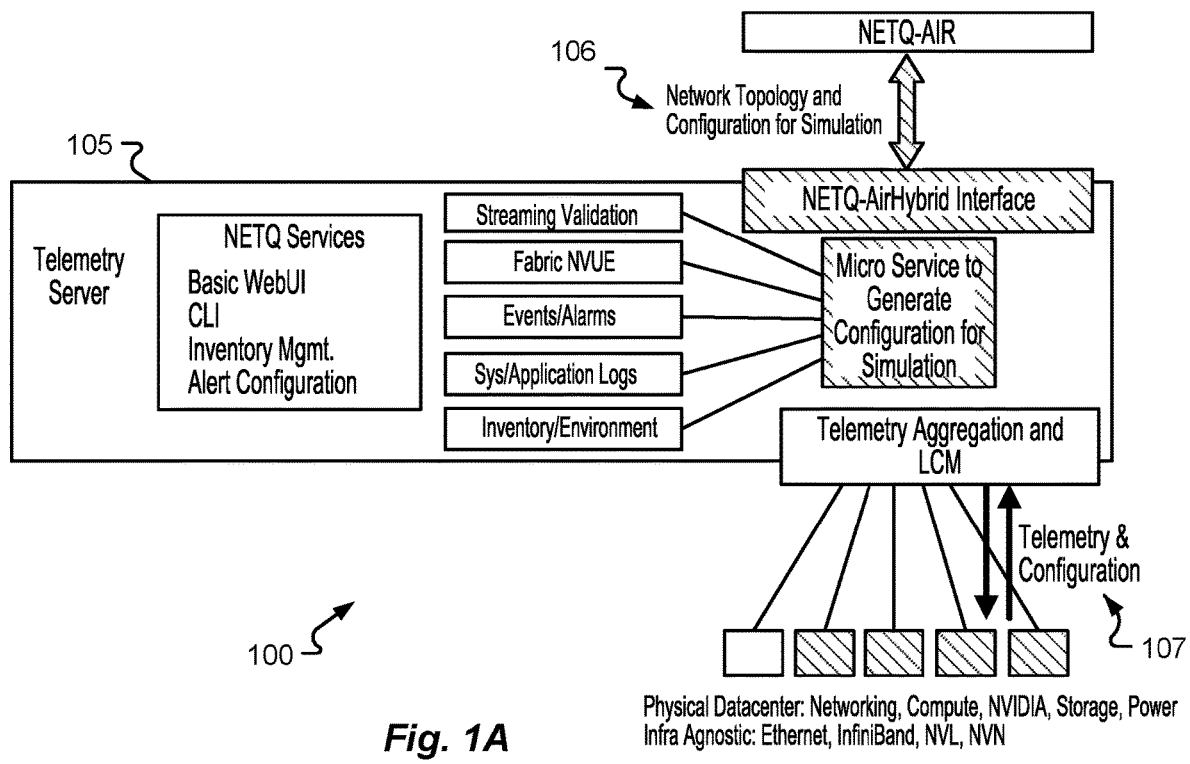
FIG. 1A illustrates an example of a system that support aspects of the present disclosure.

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

A network fabric is a mesh network topology with virtual or physical network elements, forming a single fabric. A network fabric describes the network topology in which components pass data to each other through interconnecting switches. In some cases, a network fabric may include hubs, switches, adapter endpoints, and connecting cables that support a communication protocol between entities (e.g., devices, virtual machines, etc.).

Some examples of network fabrics include Layer 2 fabric designs and Layer 3 fabric designs. Layer 3 fabric designs are based on routing protocols such as, for example, OSPF (Open Shortest Path First) and BGP (Border Gateway Protocol). Layer 2 fabric designs use technologies such as, for example, Lots of Links (TRILL), Shortest Path Bridging (SPB), and Virtual Extensible LAN (VXLAN) over Layer 3. Layer 3 fabrics offer ease of troubleshooting, improved scalability, and improved predictability of the traffic flows through the fabrics, but are unable to provide Layer 2 connectivity by itself. Layer 2 connectivity is, in some cases, imposed by business applications derived from the application workflows or virtualization environments.

Some techniques include simulating a network fabric (also referred to herein as a network topology) using a network simulator so as to evaluate performance of the network design prior to deployment of the network fabric in an actual environment (e.g., a datacenter). In some cases, simulating a physical network topology may require the network configurations and states of network entities that are part of the physical network topology and are to be included as part of the simulation. Improved techniques are desired for deriving network configurations including network entities and deriving states of the network entities.

Aspects of the present disclosure support systems for building custom 3D pipelines and workflows, simulating large-scale virtual worlds (e.g., Omniverse, Metaverse, etc.), simulating physical worlds, simulating network fabric/topology, and the like. In some aspects, the systems support the simulation of physical networks in association with implementing robotic datacenters.

In association with simulating physical networks, the systems described herein support deriving the configurations and states of network entities (e.g., devices) to be simulated as part of the simulated network topology. For example, as a physical network transitions through various phases (e.g., stable and steady working conditions, unstable conditions, etc.) the systems described herein support deriving states and configurations for simulating the physical network in association with the various phases. In an example, the systems described herein support network simulation aimed at simulating stable and steady working conditions, simulating unstable/error conditions, and merging network configurations from multiple physical topologies (e.g., Layer 2 fabric designs, Layer 3 fabric designs, etc.).

Aspects of the present disclosure support techniques for deriving networking configurations from a physical network topology for a target use case. For example, the techniques may support deriving network configurations and device states for simulating a physical network topology in association with the target use case.

In some example implementations, for devices that are part of the physical network topology, the techniques described herein may include deriving the network configurations and device states from data acquired in association with the physical network topology/fabric. Non-limiting examples of the data and acquiring the data include: streaming validation results for various network functions, events and alarms, application and system logs streamed to a telemetry server (also referred to herein as a network telemetry server), periodic system monitoring and sensor data streamed to the telemetry server, and streaming data for network configurations and state (e.g., running state such as sensor data).

The techniques include connecting (e.g., physically and/or wirelessly coupling) the physical network topology to the telemetry server and streaming data from connected network devices of the physical network topology to the telemetry server. Aspects of the present disclosure support storing the data (e.g., streamed data, telemetry data, as collected at the telemetry server) locally at the telemetry server or a centralized repository to support longer durations. The centralized repository may be, for example, a data lake, a data warehouse, or the like. In some cases, the techniques include collecting and processing the collected data in a microservice capable of generating network configurations and device states for various target conditions.

Examples of deriving network configurations and states supported by aspects of the present disclosure include: 1) deriving a network configuration/states of network entities for simulating stable and steady working conditions (working steady state), 2) deriving a network configuration/states of network entities for simulating unstable/error conditions, and 3) extending and deriving (e.g., extrapolating) a new network configuration and/or device states from available physical network configurations and device states.

Examples of deriving the network configurations and states of network entities are described herein.

1) Deriving a Network Configuration and States of Network Entities for Simulating Stable and Steady Working Conditions—Working Steady State The techniques described herein may include monitoring the stream validation for various network functions and verifying whether all the streaming validations are passing (e.g., satisfy one or more criteria) for configured durations. In an example case of stream validation, validations will be running in the network telemetry server for any changes related to network functions. In some aspects, the techniques may include implementing streaming validations for network functions of a physical network topology. Non-limiting examples of the network functions include: a) interface or link, b) L2 functionality, c) L3 functionality, d) routing functionality (e.g., for BGP, OSPF, Ethernet Virtual Private Network (EVPN), etc.), and e) data plane forwarding (e.g., L2/L3, EVPN, etc.).

In some aspects, monitoring the stream validation may include monitoring events and any generated alarms to verify that there are no configuration-induced critical errors.

In some other aspects, monitoring the stream validation may include monitoring application and system logs in the network devices.

In an example implementation of deriving a network configuration, the techniques may include gathering network device configurations and topology information for a temporal period during which at least the following criteria are satisfied: streaming validations for various network functions are passing; no critical events or critical errors are present; and the system is in a stable state (also referred to herein as a stable condition). In some examples, the techniques may include deriving, from system monitoring and sensor data, whether the system is in a stable state. In an example of determining whether the network is in a stable state, the techniques may include checking thresholds for CPU, memory, and storage. For example, the techniques may include checking or evaluating CPU usage, memory usage, and storage usage of the system against respective thresholds.

Once the criteria and configured threshold are checked as described herein, the techniques may include generating the network topology and configuration (associated with a stable condition) for simulation.

2) Deriving a Network Configuration and States of Network Entities for Simulating Unstable/Error Conditions In association with deriving unstable conditions and/or error conditions, as well as network configuration and device states, the techniques may include monitoring at least the following inputs: streaming validations for various network functions, critical events/errors, and system monitoring and logs.

In some aspects, the derivation techniques may include deriving a delta configuration between a failure condition and a previous stable working condition, for each network device. The techniques may further include, based on streaming validation results, tagging networking functions for which validations are failing (e.g., fail to satisfy one or more criteria) and collecting configurations associated with the tagged networking functions. Accordingly, for example, the techniques described herein may support using the tags to generate a network configuration for a particular condition (e.g., failure condition, error condition, unstable condition, etc.).

3) Extending and Deriving (e.g., Extrapolating) a New Network Configuration and States of Network Entities from Available Physical Network Configurations and Device States—Merging Network Configurations from Multiple Physical Network Topologies Aspects of extending and deriving (e.g., extrapolating) a new network configuration and states of network entities from available physical network configurations and device states may incorporate and extend upon aspects of deriving a network configuration and states of network entities for simulating stable and steady working conditions as described herein.

In an example implementation, different environments (also referred to herein as 'premises') (e.g., datacenters) may have the same physical network topology but different network configurations. For example, a first environment may have an L2 configuration, whereas a second environment may have an L3 configuration.

The techniques described herein may include deriving a stable configuration for simulation from each of the network environments. In an example, for a target use case of having a combined L2/L3 configuration, the techniques may include merging stable configurations from the first network environment and the second network environment and generating a combined L2/L3 configuration for the simulation.

Aspects of the disclosure are further illustrated by and described with reference to apparatus diagrams, system diagrams, and flowcharts that relate to deriving network configurations and device states for simulating a physical network fabric.

FIG. 1A illustrates an example of system 100 in accordance with aspects of the present disclosure. The system 100 may include a telemetry server 105 that supports deriving network configurations and device states for simulating a physical network fabric as described herein.

The telemetry server 105 may support streaming validation, a user experience (e.g., fabric NVIDIA User Experience (NVUE)) supportive of a command line interface (CLI) and an application programming interface (API), events/alarms, system and application logs, and inventory/environment.

The system 100 and telemetry server 105 may support a highly-scalable, modern network operations tool set (NetQ) that utilizes telemetry for deep troubleshooting, visibility, and automated workflows from a single GUI interface, reducing maintenance and network downtimes. The tool set combines the ability to easily upgrade, configure and deploy network elements with a full suite of operations capabilities, such as visibility, troubleshooting, validation, trace and comparative look-back functionality.

The system 100 may support electronic communication with a physical datacenter. The system 100 may support infra agnostic networking communications (e.g., Ethernet, InfiniBand, NVLink (NVL) (direct GPU-to-GPU interconnect), etc.). The system 100 may support network topology and configuration for simulation (106) and support telemetry and configuration (107), aspects of which are described herein.

Figure 1B:
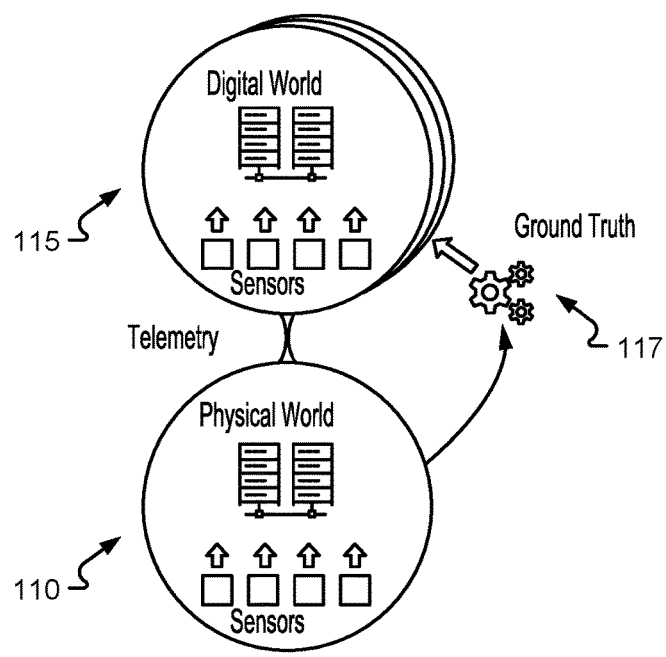
FIG. 1B illustrates an example of a physical world and a digital world for which the system may monitor and derive network configurations.

FIG. 1B illustrates an example of a physical world 110 and a digital world 115 for which the system 100 may monitor and derive network configurations.

The system 100 may support deriving networking configurations from a physical world 115 (also referred to herein as a physical environment, a physical network, or a physical network environment) for a target use case. In an example, the system 100 supports deriving network configurations and device states from data acquired in association with the physical world 115 and the target use case. Non-limiting examples of the data include: streaming validation results for various network functions, events/alarms 130, system and application logs 135 streamed to the telemetry server 105, and periodic system monitoring and sensor data streamed to the telemetry server 105 (e.g., from sensors included in the physical network topology of the physical world 110). Techniques described herein include connecting (e.g., physically and/or wirelessly coupling) the physical network of the physical world 115 to the telemetry server 105 and streaming the data from connected network devices of the physical network topology to the telemetry server 105.

The system 100 may support applying the derived network configurations and device states for simulating a digital world 115 (also referred to herein as a digital environment, a digital representation of the physical world 110, a digital representation of the physical network or physical network environment, or a simulated representation of the physical network or physical network environment) in association with the target use case, aspects of which are described herein. In some aspects, the system 100 may support utilizing ground truth data 117 for training or validating artificial intelligence (AI)/machine learning (ML) models for simulating the physical network topology and the digital world 115.

The system 100 may support techniques of connecting a network fabric to a network telemetry server (e.g., telemetry server 105) and deriving a network configuration for a simulated network fabric using the following information: streaming the network configuration from all connected network devices, streaming validation and verification for various network functions, streaming and monitoring critical events/errors, and streaming system and application logs. The techniques include using the information to output a network fabric topology for simulating stable and error conditions. The techniques may be extended to merge configurations from multiple similar physical topologies.

Figure 2:
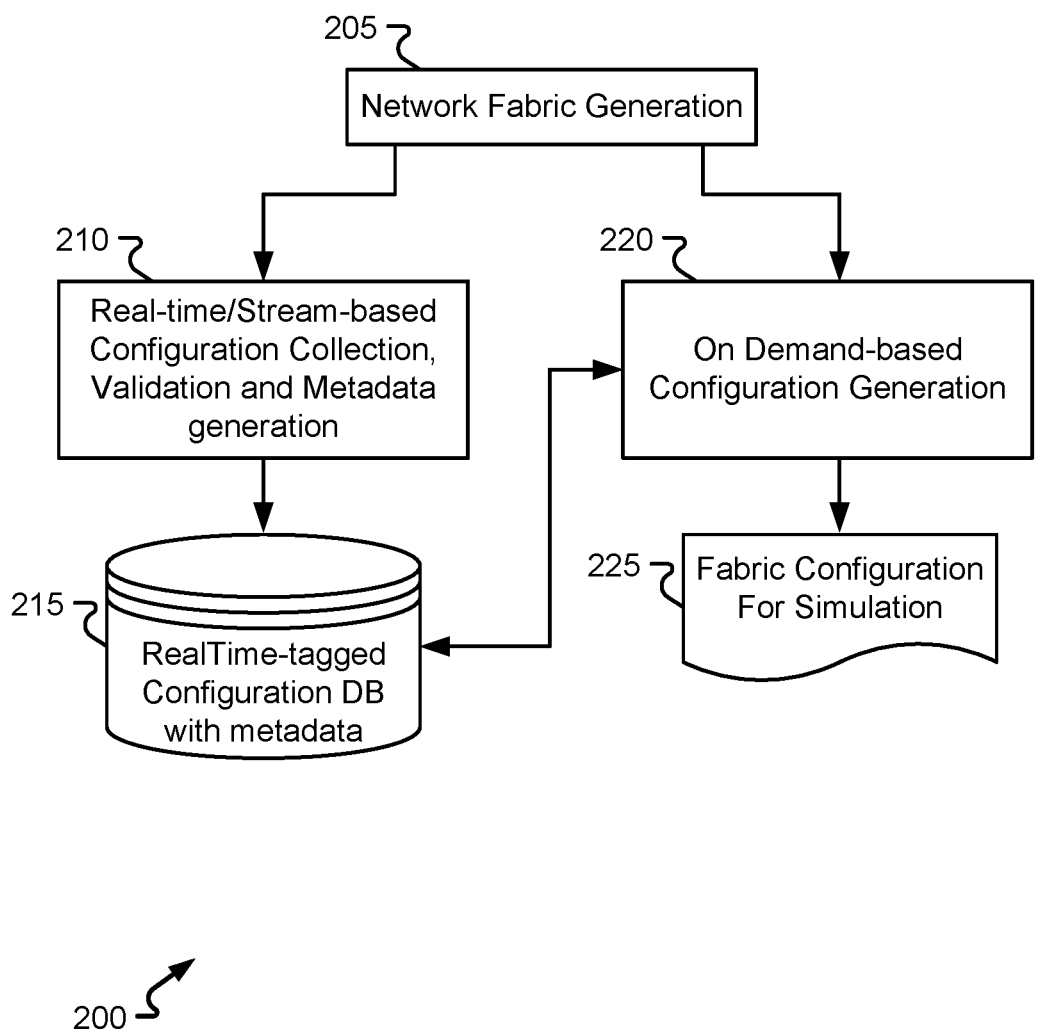
FIG. 2 is an example block diagram that supports aspects of the present disclosure.

FIG. 2 is an example block diagram 200 that supports aspects of the present disclosure. Aspects of the block diagram 200 may be implemented by the system 100 of FIG. 1.

The system 100 may support generating a network fabric (at 205). The system 100 may support (at 210) real-time/stream-based configuration collection, configuration validation, and metadata generation in association with a configuration(s) of the network fabric as generated at 205. The system 100 may support real-time generation of data records corresponding to the configuration(s) of the network fabric and storing of the data records to a data repository 215. The data records may include tag information indicating version information of the configuration(s).

The system 100 may support (at 220) on demand-based generation of a second configuration (e.g., fabric configuration 225) of the network fabric using the data records stored in the data repository 215. In an example, the system 100 may simulate the physical network using the second configuration to evaluate design performance, prior to deployment of the second configuration of the network fabric in an actual environment (e.g., physical world 110 of FIG. 1).

Additional example aspects of 205 through 225 are later described herein.

Figure 3:
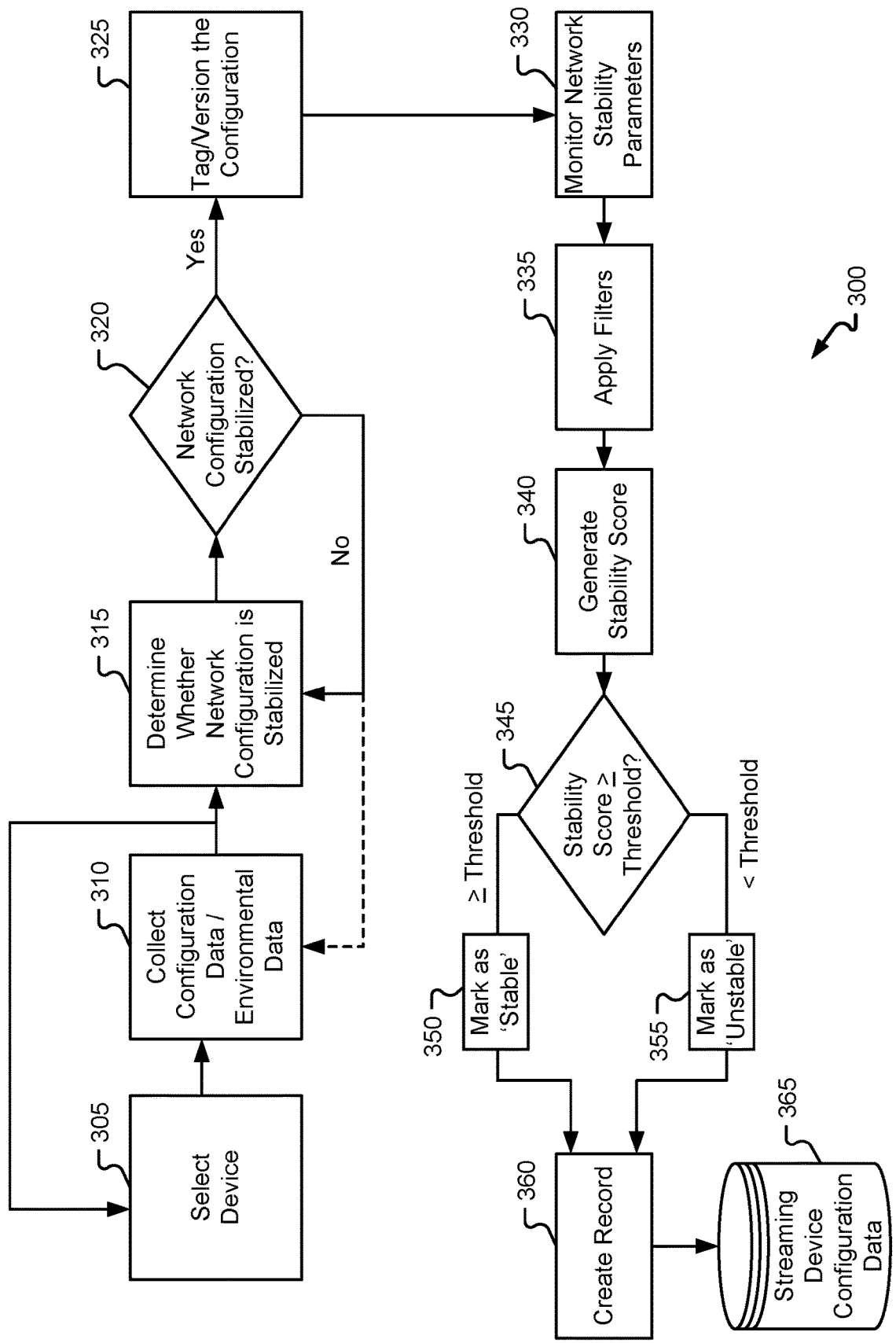
FIG. 3 illustrates an example of a process flow that supports aspects of the present disclosure.

FIG. 3 illustrates an example of a process flow 300 that supports deriving network configuration and state for physical network fabric simulation in accordance with aspects of the present disclosure. In some examples, process flow 300 may implement aspects of the system 100, telemetry server 105, physical world 110 (e.g., a network of the physical world 110), and digital world (e.g., a simulation of the network) described with reference to FIG. 1.

In the following description of the process flow 300, the operations may be performed in a different order than the order shown, or the operations may be performed in different orders or at different times. Certain operations may also be left out of the process flow 300, or other operations may be added to the process flow 300.

It is to be understood that any device (e.g., telemetry server 105, a computing device in communication with the telemetry server 105, etc.) may perform any number of the operations of process flow 300.

The process flow 300 supports real-time/stream-based configuration collection and validation. In an example, the process flow 300 may include collecting configuration data and/or environmental data associated with one or more devices (e.g., network devices) of a physical network, in association with a configuration of the network. For example, at 305, the process flow 300 may include selecting a device of the network. At 310, the process flow 300 may include collecting the configuration data and/or environmental data associated with the selected device.

The configuration data may include a configuration of the device in association with the network. The environmental data may include temperature information associated with the device (e.g., measured temperature of the device), memory resources associated with the device (e.g., disk usage, available memory, etc.), and/or sensor data associated with the device. In some examples, the process flow 300 may include iteratively selecting devices of the network and collecting respective configuration data and/or environmental data until the configuration data and/or environmental data has been collected for all devices included in the network configuration. The environmental data may include the outside environment in which the network device (or devices) is operating. In an example of a lab environment, the environmental data may include rack layout details, power consumption, air flow, temperature, cooling, PDUs, and the like. In some aspects, sensors separate from the network devices may collect the environmental data, and an entity separate from the network devices may stream the environmental data to the telemetry server 105.

The network configuration may include an indication of devices, device configurations, and topology for implementing the network. In some cases, the network configuration may include an indication of the communication protocol supported by the devices and the network configuration.

At 315, the process flow 300 may include determining whether the network configuration is stabilized. For example, the process flow 300 may include determining a stability status associated with the network and the network configuration based on stability information associated with the network. The process flow 300 may include validating the network configuration based on the stability status.

In an example, the stability information may include one or more stability parameters associated with the network and the network configuration. The stability parameters may include device streaming validation results (e.g., results associated with validating the network configuration of the network). In some aspects, the stability parameters may include events/alarms (e.g., an event log associated with the network). In an example, the event log may include an indication of one or more events and/or one or more alarms.

In some other aspects, the stability parameters may include a system log associated with the network. In some example aspects, the stability parameters may include an application log associated with devices of the network. In some cases, the stability parameters may include a data packet log associated with the network. The data packet log may include an indication of a quantity of data packet drops and/or a frequency of data packet drops. In some other examples, the stability parameters may include the environmental data (as collected at 310) associated with the devices.

At 320, in response to determining the network configuration is not stabilized (e.g., 'No'), the process flow 300 may include returning to 315 to redetermine whether the network configuration is stabilized. Additionally, or alternatively, the process flow 300 may include returning to 310 to collect additional configuration data and/or environmental data, prior to redetermining whether the network configuration is stabilized.

At 320, if the network configuration is stabilized (e.g., 'Yes'), the process flow 300 may include proceeding to 325 ('tag/version the configuration'). For example, at 325, the process flow 300 may include generating a configuration tag indicating version information associated with the configuration. In an example, the version information may include a combination of numerical and/or alphabetical identifiers. Additionally, or alternatively, the process flow 300 may include generating a configuration tag indicating version information associated with a network configuration for which the network configuration is not stabilized.

At 330, the process flow 300 may include monitoring network stability parameters associated with the network and the network configuration. For example, the process flow at 330 may include recording stability information associated with the network and the network configuration. The stability information may include the stability parameters described herein and respective values of the stability parameters. In some cases, recording the stability information may be implemented in response to determining the stability status (at 315) associated with the network and the network configuration. In some other cases, recording the stability information may be implemented in response to generating the tag (at 325).

At 335, the process flow 300 may include applying one or more filters to remove errors based on one or more criteria. For example, at 335, the process flow 300 may include applying filters to remove any errors that were not configuration induced.

At 340, the process flow 300 may include generating a stability score associated with the network and the network configuration. In an example, generating the stability score may be based on the stability information (e.g., one or more stability parameters, respective values of the stability parameters, etc.) described herein. The terms 'stability score' and 'health score' may be used interchangeably herein.

In some aspects, the process flow 300 may include assigning and/or applying weighting factors to each of the stability parameters. The process flow 300 may include validating each of the stability parameters and computing a cumulative stability score. In some examples, the process flow 300 may include incorporating the weighting factors in association with computing the cumulative stability score.

At 345, the process flow 300 may include comparing the cumulative stability score to a threshold stability score. For example, the process flow 300 may include determining whether the cumulative stability score is greater than or equal to the threshold stability score. Additionally, or alternatively, the process flow 300 may include comparing individual stability scores (e.g., corresponding to respective stability parameters) to respective threshold stability scores.

At 350, in response to a comparison result in which the stability score is greater than or equal to the threshold stability score, the process flow 300 may include marking the network and the network configuration as 'stable'. In some aspects, the process flow 300 may include assigning a classification 'stable' to the network and the network configuration.

At 355, in response to a comparison result in which the stability score is less than the threshold stability score, the process flow 300 may include marking the network and the network configuration as 'unstable'. In some aspects, the process flow 300 may include assigning a classification 'unstable' to the network and the network configuration. In some cases, the process flow 300 may include identifying and recording one or more failure events associated with the 'unstable' condition of the network (e.g., recording the reason for error/failure).

At 360, the process flow 300 may include generating a data record corresponding to the network configuration and storing the data record to a data repository 365. In some cases, the process flow 300 may include generating metadata that includes the data record and storing the metadata to the data repository 365. The data record may include the configuration data and/or environmental data collected at 310. In some aspects, the data record may include the configuration tag generated at 325 and information included in the configuration tag. In some example aspects, the data record may include the stability score generated at 340. In some examples, the data record may include a classification (e.g., 'stable' for the case associated with 350, 'unstable' for the case associated with 355) associated with the network and the network configuration. For the example case in which the network is 'unstable', the data record may include the indication of the one or more failure events identified at 355.

In some other examples, the data record may include temporal information associated with the data record. In some aspects, the temporal information may include a timestamp corresponding to the generation of the data record at 360. In some other aspects, the timestamp may correspond to any of the information included in the data record. For example, the timestamp may correspond to the collection of the configuration data and/or environmental data (e.g., at 310), the determination of whether the network configuration is stabilized (e.g., at 315), the generation of the stability score (e.g., at 340), and the like.

Accordingly, for example, a data record stored to the data repository 365 in association with a streaming device (e.g., a network device) may include a stability score of a network configuration, a timestamp corresponding to the stability score, and a configuration tag/version information.

The data repository 365 may include candidate network configurations that each include a network topology. In some aspects, the data repository 365 may include data records for generating or deriving the candidate network configurations. Example aspects of the data repository 365 associated with deriving a network configuration for physical network fabric simulation are later described with reference to FIGS. 4 and 5.

Figure 4:
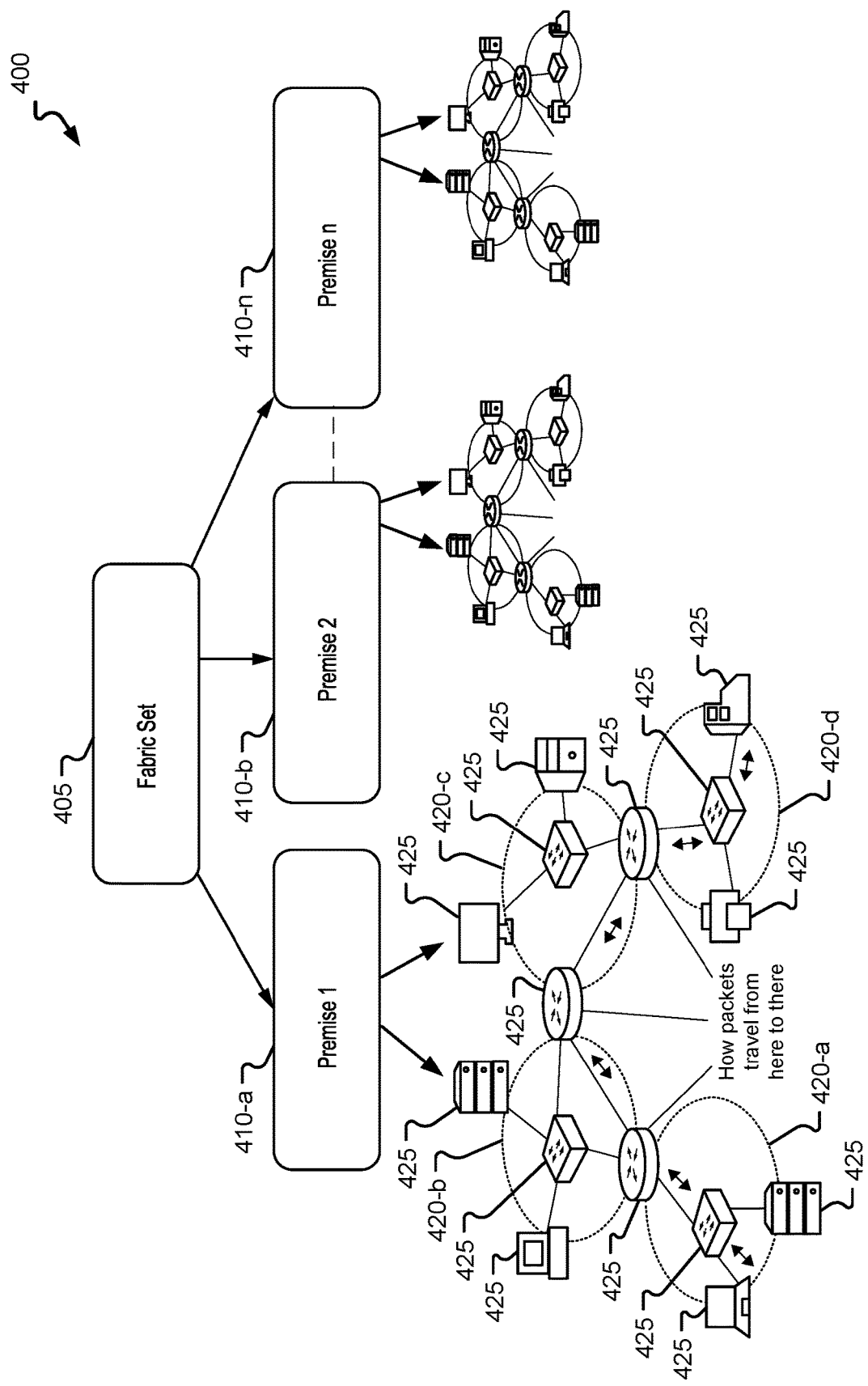
FIG. 4 illustrates an example diagram that supports aspects of the present disclosure.

FIG. 4 illustrates an example diagram 400 that supports the use of data records for deriving network configurations in accordance with aspects of the present disclosure. The data records may include aspects of the data repository 365 described with reference to FIG. 3.

For a fabric set 405, the data repository 365 may be a database including linkages built inside the database that support traversing from devices 425 of a premise 410 (e.g., premise 410-a, also referred to herein as 'Premise 1') to the fabric set 405. In some aspects, from the fabric set 405, the data repository 365 may support identifying all premises 410 (e.g., premise 410-a through premise 410-n, where n is an integer value) and identifying networks 420 (e.g., network 420-a through 420-d) of each premise 410 and devices 425 of each premise 410. The premises 410 may also be referred to as environments.

Example aspects of utilizing the data repository 365 in association with on-demand based configuration generation that is based on the fabric set 405 are described with reference to FIG. 5.

Figure 5:
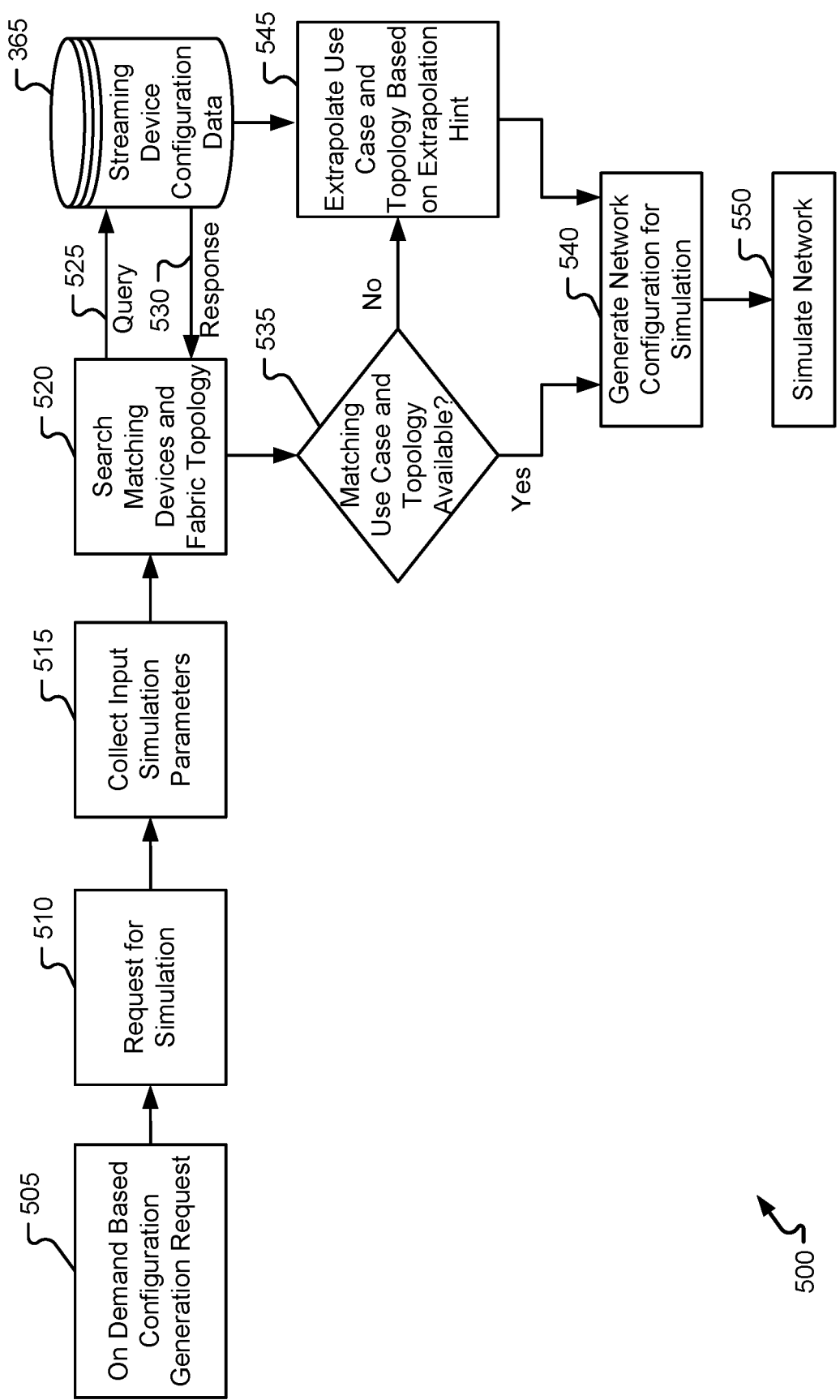
FIG. 5 illustrates an example of a process flow that supports aspects of the present disclosure.

FIG. 5 illustrates an example of a process flow 500 that supports deriving network configuration and state for physical network fabric simulation in accordance with aspects of the present disclosure. In some examples, process flow 500 may implement aspects of the system 100 and telemetry server 105 described with reference to FIG. 1.

Aspects of the process flow 500 may support on-demand based configuration generation using real-time configuration monitoring and analysis database. The process flow 300 may support forming requests for a query, deriving a matching topology from real-time/streaming-based configuration data (e.g., as described with reference to process flow 300), and configuration extrapolation for generating a fabric configuration for unseen/new environments.

In the following description of the process flow 500, the operations may be performed in a different order than the order shown, or the operations may be performed in different orders or at different times. Certain operations may also be left out of the process flow 500, or other operations may be added to the process flow 500.

It is to be understood that any device (e.g., telemetry server 105, a computing device in communication with the telemetry server 105, etc.) may perform any number of the operations of process flow 500.

At 505, the process flow 500 may include receiving an on-demand based request for generating a network configuration.

In an example, the request may include one or more input simulation parameters (also referred to herein as target simulation parameters). The input simulation parameters may include a topology input indicating a target topology (e.g., a desired topology type, for example, L2, L3, a combination of L2 and L3, etc.) for the network. In some aspects, the input simulation parameters may include a target stability score for the network.

In some other aspects, the input simulation parameters may include a target use case associated with the network. In an example, the target use case may be a stable network configuration for a target topology (e.g., a requested topology) indicated in the input simulation parameters. In another example, the target use case may include a specific error/failure condition to be used in association with deriving the stable network configuration. In some aspects, the input simulation parameters may include an extrapolation indicator (also referred to herein as an 'extrapolation required hint') that indicates whether to extrapolate the target topology and/or the target use case.

At 510, the process flow 500 may include receiving a request for simulating the network based on the network configuration and the input simulation parameters. In some example implementations, the input simulation parameters described with reference to 505 may be received in the request at 510.

At 515, the process flow 500 may include collecting the input simulation parameters.

At 520, the process flow 500 may include searching the data repository 365 for devices (e.g., devices 425) and fabric topologies. For example, the process flow 500 may include transmitting a query 525 to the data repository 365 and receiving a corresponding response 530. The query 525 may include the input simulation parameters (e.g., target topology, target use case, target stability score, etc.) described herein.

The response 530 may include an indication of whether simulation parameters (e.g., topology, use case, stability score, etc.) of a candidate network configuration stored in the data repository 365 matches the simulation parameters included in the query 525. In an example, the response 530 may include an indication of whether a candidate network configuration exists for which the use case and fabric topology matches the target use case and target topology indicated in the query 525. In some cases, the response 530 may include an indication of the candidate network configuration.

At 535, the process flow 500 may include determining whether a candidate network configuration is available, for which the use case and fabric topology matches the target use case and target topology indicated in the query 525

('Matching Use Case and Topology Available?'). For example, the process flow 500 may include identifying, from the response 530, whether such a candidate network configuration is available from the data repository 365.

At 540, in response to identifying from the response 530 that a candidate network configuration having a matching use case and matching fabric topology is available (e.g., 'Yes'), the process flow 500 may include generating the candidate network configuration for simulation.

At 545, in response to identifying from the response 530 that a candidate network configuration having a matching use case and matching fabric topology is not available (e.g., 'No'), the process flow 500 may include deriving (e.g., extrapolating) the use case and the fabric topology. For example, the process flow 500 may include determining, based on the extrapolation indicator (extrapolation required hint) described with reference to 505, whether to extrapolate the use case and the fabric topology.

In some aspects, the process flow 500 may extrapolate the use case and the fabric topology using AI/ML models described herein. Aspects of the present disclosure support extrapolating the use case and fabric topology using device and network configuration data provided by the data repository 365 and/or an available dataset.

At 550, the process flow 500 may include simulating the network based on the network configuration and using the input simulation parameters.

Figure 6:
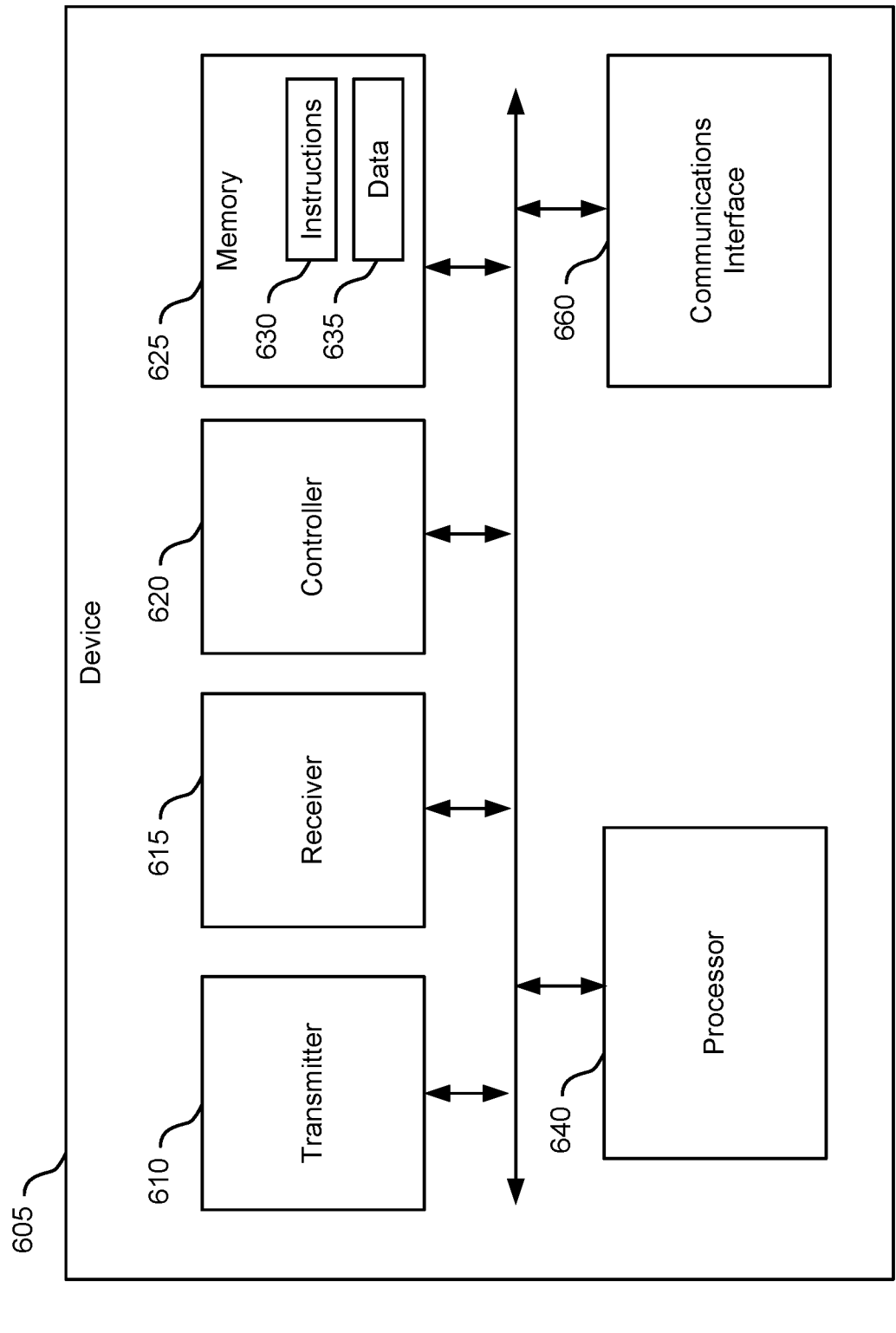
FIG. 6 illustrates an example of system that supports aspects of the present disclosure.

FIG. 6 illustrates an example of a system that supports aspects of the present disclosure. The system 600 may include a device 605. The device 605 may include aspects of the telemetry server 105 described with reference to FIG. 1. In some cases, the device 605 may be referred to as a computing resource. The device 605 may be a computing device capable of performing any or all of the operations described in the present disclosure.

The device 605 may include a transmitter 610, a receiver 615, a communications interface 620, a controller 620, a memory 625, a processor 640, and a communications interface 660. In some examples, components of the device 605 (e.g., transmitter 610, receiver 615, controller 620, memory 625, processor 640, communications interface 660, etc.) may communicate over a system bus (e.g., control busses, address busses, data busses, etc.) included in the device 605.

The transmitter 610 and the receiver 615 may support the transmission and reception of signals to and from the device 605. In some aspects, the transmitter 610 and the receiver 615 may support the transmission and reception of signals within the device 605. The transmitter 610 and receiver 615 may be collectively referred to as a transceiver. An antenna may be electrically coupled to the transceiver. The device 605 may also include (not shown) multiple transmitters 610, multiple receivers 615, multiple transceivers and/or multiple antennas.

The controller 620 may be located on a same chip (e.g., ASIC chip) as the transmitter 610 and/or the receiver 615. In some cases, the controller 620 may be located on a different chip as the transmitter 610 and/or the receiver 615. In some examples, the controller 620 may be located on a chip of or on a chip of another device 605. The controller 620 may instruct the transmitter 610 to use one or more DBI encoding algorithms for encoding data to be sent via a data bus. In some examples, the controller 620 may instruct the receiver 615 to use one or more DBI encoding algorithms for decoding data that is received via the data bus. In some examples, the controller 620 may be a programmed microprocessor or microcontroller. In some aspects, the controller 620 may include one or more CPUs, memory, and programmable I/O peripherals.

The memory 625 may be any electronic component capable of storing electronic information. The memory 625 may be, for example, random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 625 may include instructions 630 (computer readable code) and data 635 stored thereon. The instructions 630 may be executable by the processor 640 to implement the methods disclosed herein. In some aspects, execution of the instructions 630 may involve one or more portions of the data 650. In some examples, when the processor 640 executes the instructions 630, various portions of the instructions 630 and/or the data 635 may be loaded onto the processor 640.

The processor 640 may correspond to one or multiple computer processing devices. For example, the processor 640 may include a silicon chip, such as a Field Programmable Gate Array (FPGA), an ASIC, any other type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute instructions sets stored in a corresponding memory (e.g., memory 625 of the device 605). For example, upon executing the instruction sets stored in memory 625, the processor 640 may enable or perform one or more functions of the device 605. In some examples, a combination of processors 640 (e.g., an advanced reduced instruction set computer (RISC) machine (ARM), a digital signal processor (DSP), etc.) may be implemented in the device 605.

The processor 640 may support processing of computationally intensive workloads (e.g., artificial intelligence, deep learning, data science, etc.). For example, the processor 640 may utilize data stored in the memory 625 as a neural network. The neural network may include a machine learning architecture. In some aspects, the neural network may be or include an artificial neural network (ANN). In some other aspects, the neural network may be or include any machine learning network such as, for example, a deep learning network, a convolutional neural network, or the like. Some elements (e.g., data 635) stored in memory 625 may be described as or referred to as instructions or instruction sets, and some functions of the device 605 may be implemented using machine learning techniques.

The communications interface 660 may support interactions (e.g., via a physical or virtual interface) between a user and the device 605.

Figure 7:
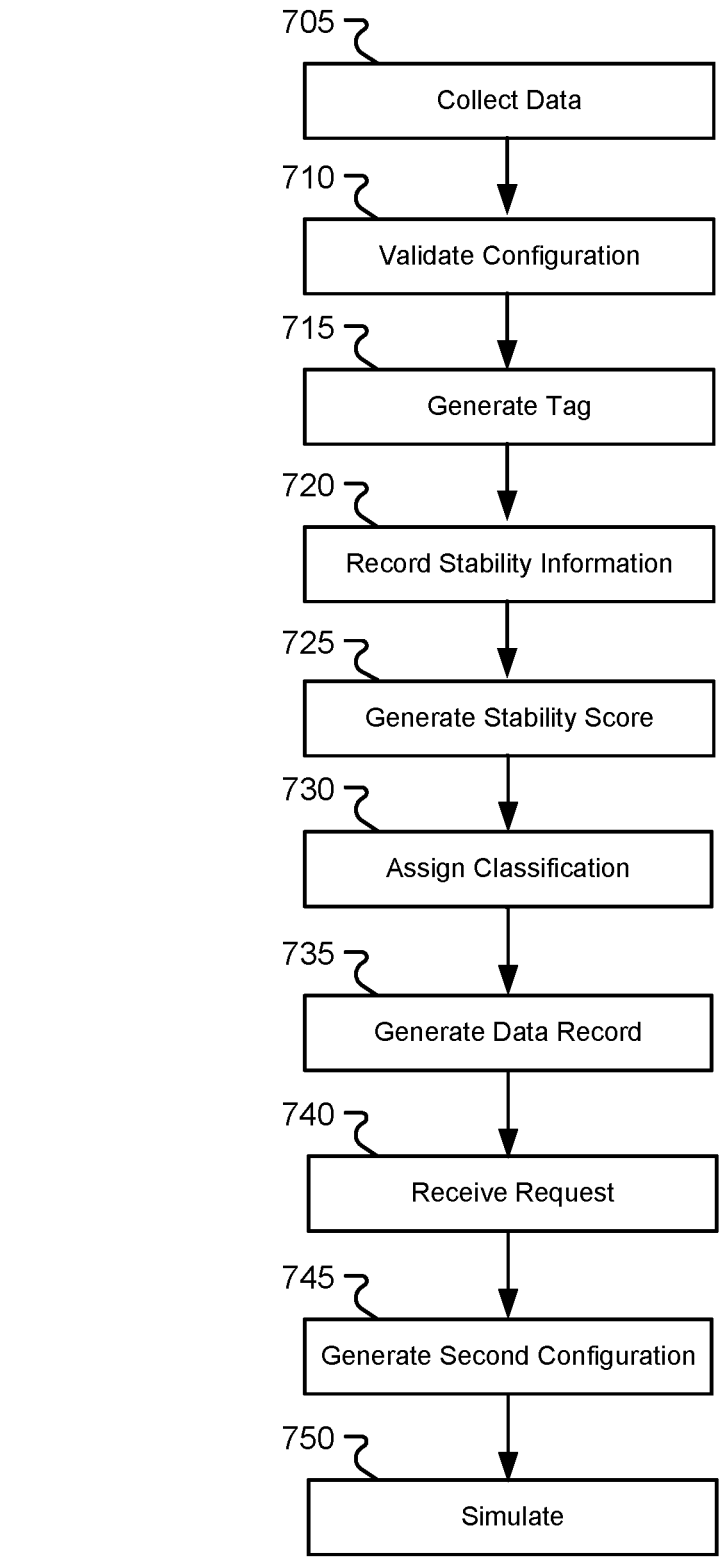
FIG. 7 illustrates an example of a process flow that supports aspects of the present disclosure.

FIG. 7 illustrates an example of a process flow 700 that supports deriving network configuration and state for physical network fabric simulation in accordance with aspects of the present disclosure. In some examples, process flow 700 may implement aspects of the system 100, telemetry server 105, system 600, and device 605 described with reference to FIGS. 1 and 6.

In the following description of the process flow 700, the operations may be performed in a different order than the order shown, or the operations may be performed in different orders or at different times. Certain operations may also be left out of the process flow 700, or other operations may be added to the process flow 700.

It is to be understood that any device (e.g., telemetry server 105, a computing device in communication with the telemetry server 105, etc.) may perform any number of the operations of process flow 700.

At 705, the process flow 700 may include collecting configuration data associated with one or more devices of a network, in association with a configuration of the network.

In some aspects, at 705, the process flow 700 may include collecting environmental data associated with the one or more devices, in association with the configuration of the network. In some aspects, the environmental data includes at least one of: temperature information associated with the one or more devices; memory resources associated with the one or more devices; and sensor data associated with the one or more devices.

At 710, the process flow 700 may include validating the configuration of the network, wherein validating the configuration includes determining a stability status associated with the network and the configuration.

In some aspects, validating the configuration of the network is based on one or more stability parameters including at least one of: the results associated with validating the configuration of the network; an event log associated with the network, wherein the event log includes an indication of one or more events, one or more alarms, or both; a system log associated with the network; an application log associated the one or more devices; a data packet log associated with the network, wherein the data packet log includes an indication of a quantity of data packet drops, a frequency of data packet drops, or both; and environmental data associated with the one or more devices.

At 715, the process flow 700 may include generating a tag indicating version information associated with the configuration, in response to determining the stability status associated with the network and the configuration.

At 720, the process flow 700 may include recording stability information associated with the network and the configuration in response to determining the stability status associated with the network and the configuration.

At 725, the process flow 700 may include generating a stability score associated with the network and the configuration based on the stability information recorded in association with the network and the configuration. In some aspects, the stability information includes: one or more stability parameters associated with the configuration; and one or more weighting factors associated with the one or more stability parameters.

At 730, the process flow 700 may include assigning a classification to the network and the configuration based on a comparison of the stability score associated with the network and the configuration and a threshold stability score, wherein the classification includes an indication of the network and the configuration as stable or unstable.

In some aspects, the process flow 700 may include, in response to a comparison result in which the stability score associated with the network and the configuration is less than a threshold stability score: assigning the classification to the network and the configuration, wherein the classification includes an indication of the network and the configuration as unstable; and adding, to a data record, an indication of one or more failure events associated with the network and the configuration.

At 735, the process flow 700 may include generating a data record corresponding to the configuration of the network and storing the data record to a data repository. In some aspects, the data record includes: the configuration data associated with the one or more devices; and results associated with validating the configuration of the network. In some aspects, the data record includes the environmental data.

In some aspects, the data record includes at least one of: the configuration data associated with the one or more devices; environmental data associated with the one or more devices; a configuration tag including version information of the configuration of the network; a stability score associated with the network and the configuration; a classification associated with the network and the configuration; and temporal information associated with the data record.

In some aspects, the data repository includes: one or more candidate configurations, wherein each of the candidate configurations includes a network topology; and a set of data records for generating the one or more candidate configurations.

In some aspects, at least one of collecting the configuration data, validating the configuration of the network, and generating the data record is performed in real-time.

At 740, the process flow 700 may include receiving a request for generating a second configuration, wherein the request includes one or more target simulation parameters.

In some aspects, the one or more target simulation parameters include at least one of: a target topology associated with the second network; a target use case associated with the second network; and a target stability score associated with the second network.

In some aspects, the one or more target simulation parameters include an extrapolation indicator associated with extrapolating at least one of: a target topology associated with the second network; and a target use case associated with the second network.

At 745, the process flow 700 may include generating the second configuration associated with simulating a second network, wherein the second configuration includes the one or more devices, one or more second devices included in the data repository, or both.

In some aspects, generating the second configuration is in response to receiving the request.

In some aspects, generating the second configuration is based on comparing one or more simulation parameters associated with the second configuration to the one or more target simulation parameters.

In some aspects, generating the second configuration includes extrapolating a topology of the second network configuration based on an extrapolation indicator included in the one or more target simulation parameters.

At 750, the process flow 700 may include simulating the second network based on the second configuration.

Figure 8:
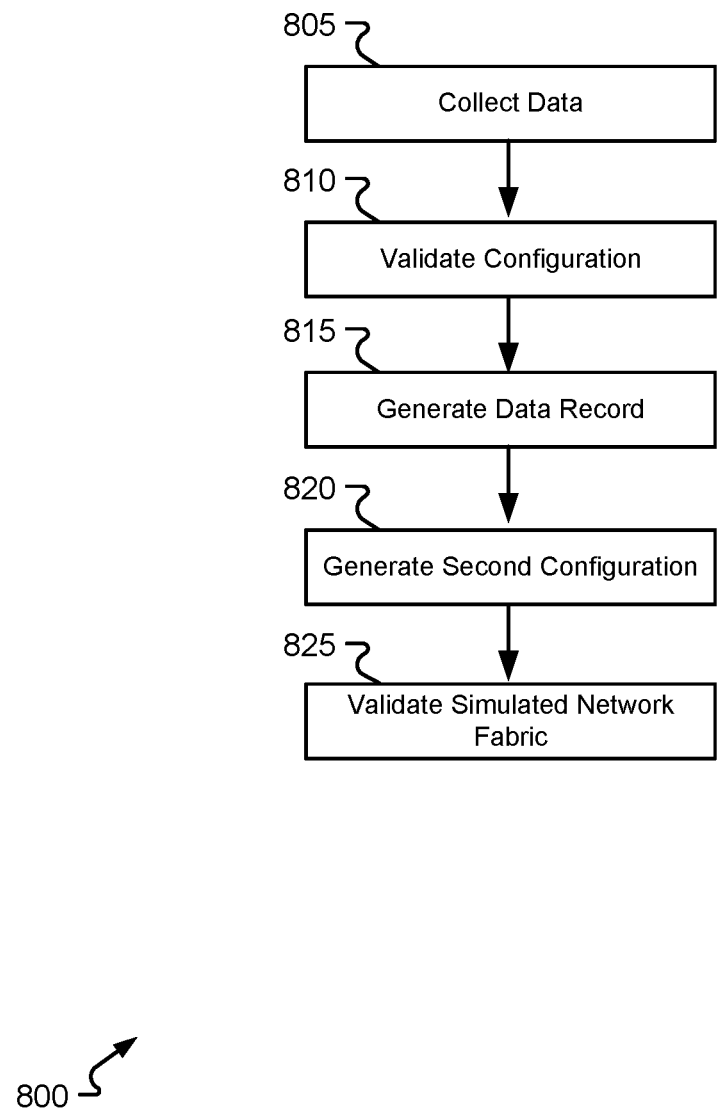
FIG. 8 illustrates an example of a process flow that supports aspects of the present disclosure.

FIG. 8 illustrates an example of a process flow 800 that supports deriving network configuration and state for physical network fabric simulation in accordance with aspects of the present disclosure. In some examples, process flow 800 may implement aspects of the system 100, telemetry server 105, system 600, and device 605 described with reference to FIGS. 1 and 6.

In the following description of the process flow 800, the operations may be performed in a different order than the order shown, or the operations may be performed in different orders or at different times. Certain operations may also be left out of the process flow 800, or other operations may be added to the process flow 800.

It is to be understood that any device (e.g., telemetry server 105, a computing device in communication with the telemetry server 105, etc.) may perform any number of the operations of process flow 800.

The process flow 800 may support generating a configuration for a simulated network fabric.

At 805, the process flow 800 includes collecting configuration data associated with one or more devices of a network fabric, in association with a configuration of the network.

At 810, the process flow 800 includes validating the configuration of the network fabric, wherein validating the configuration includes determining a stability status associated with the network fabric and the configuration.

At 815, the process flow 800 includes generating a data record corresponding to the configuration of the network fabric, wherein the data record includes: the configuration data associated with the one or more devices; and results associated with validating the configuration of the network.

At 820, the process flow 800 includes generating a second configuration associated with the simulated network fabric, in response to a request for generating the second configuration, wherein the second configuration includes the one or more devices, one or more second devices, or both.

At 825, the process flow 800 includes validating the simulated network fabric based on a result of comparing a stability score associated with the simulated network fabric and the second configuration to a threshold stability score.

Particular aspects of the subject matter described herein may be implemented to realize advantages over other techniques for determining network configurations. For example, other systems lack real-time monitoring and collection for network configuration. Other techniques derive network configurations based on the latest physical topology configurations, and such approaches are non-optimal as the approaches cannot correlate the network health and stability to the network configurations. Other techniques are unable to derive a network configuration at a particular error/state of the network topology.

The techniques described herein of streaming/real-time network topology configuration collection, monitoring, and analysis provide unique technological improvements including: real-time/stream collection methods for network configuration and environmental data; the stability parameters defined and used as described herein, methods for deriving stability scores for stable and error conditions and mapping the stability scores to device level configuration, and organization of configuration data for deriving information about fabric level configuration.

The techniques described herein association with on-demand based configuration generation using real-time configuration monitoring and analysis provide unique technological improvements including: how requests are formed for a query, how a matching topology is derived from real-time/streaming based configuration data, and how configuration extrapolation is implemented in association with generating a fabric configuration for unseen/new environments.

Any of the steps, functions, and operations discussed herein can be performed continuously and automatically.

The exemplary apparatuses, systems, and methods of this disclosure have been described in relation to examples of a system 100, a telemetry server 105, a system 600, and a device 605. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

In at least one example, architecture and/or functionality of various previous figures are implemented in context of a general computer system, a circuit board system, a game console system dedicated for entertainment purposes, an application-specific system, and more. In at least one example, device 605 may take form of a desktop computer, a laptop computer, a tablet computer, servers, supercomputers, a smart-phone (e.g., a wireless, hand-held device), personal digital assistant ("PDA"), a head mounted display, a hand-held electronic device, a mobile phone device, a workstation, embedded system, and/or any other type of logic.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An apparatus comprising:
   a processor; and
   memory in electronic communication with the processor, wherein instructions stored in the memory are executable by the processor to:
   collect configuration data associated with one or more first devices of a network that is operating in a first configuration;
   validate the first configuration of the network, wherein validating the first configuration comprises determining a stability status of the network operating in the first configuration;
   generate a data record corresponding to the first configuration of the network and store the data record to a data repository, wherein the data record comprises:
   the configuration data associated with the one or more first devices; and
   results of validating the first configuration of the network;
   receive a request for a second configuration of the network, wherein the request comprises one or more target parameters for the network, wherein the results of validating the first configuration of the network include a stability score that identifies the first configuration as either stable or unstable, and wherein the stability score is based on stability parameters which have been filtered to remove errors not induced by the first configuration;
   access, in response to the request, the data repository and determine whether the data repository contains a candidate configuration that matches the one or more target parameters for the network;
   select the candidate configuration as the second configuration of the network when the candidate configuration matches the one or more target parameters; and
   extrapolate, from one or more data records from the data repository, the second configuration of the network when the candidate configuration does not match the one or more target parameters, wherein the second configuration utilizes the one or more first devices, one or more second devices, or both; and
   simulate the second configuration of the network.

2. The apparatus of claim 1, wherein the instructions are further executable by the processor to:
   generate a tag indicating version information of the first configuration in response to determining the stability status of the network operating in the first configuration.

3. The apparatus of claim 1, wherein the instructions are further executable by the processor to:
   record stability information of the network in the first configuration in response to determining the stability status of the network operating in the first configuration.

4. The apparatus of claim 1, wherein the instructions are further executable by the processor to:
   generate the stability score based on stability information recorded with the network operating in the first configuration.

5. The apparatus of claim 4, wherein the stability information comprises:
   one or more weighting factors associated with the stability parameters.

6. The apparatus of claim 1, wherein the stability parameters comprise at least one of:
   the results of validating the first configuration of the network;
   an event log associated with the network, wherein the event log comprises an indication of one or more events, one or more alarms, or both;
   a system log associated with the network;
   an application log associated with the one or more first devices;
   a data packet log associated with the network, wherein the data packet log comprises an indication of a quantity of data packet drops, a frequency of data packet drops, or both; and
   environmental data associated with the one or more first devices.

7. The apparatus of claim 1, wherein the instructions are further executable by the processor to:
   collect environmental data for the one or more first devices operating in the first configuration of the network,
   wherein the data record comprises the environmental data.

8. The apparatus of claim 7, wherein the environmental data comprises at least one of:

temperature information associated with the one or more first devices;
memory resources associated with the one or more first devices; and
sensor data associated with the one or more first devices.

9. The apparatus of claim 1, wherein the instructions are further executable by the processor to:
assign a classification to the first configuration of the network based on a comparison of the stability score of the network operating in the first configuration and a threshold stability score, wherein the classification comprises an indication of the first configuration as being stable or unstable.

10. The apparatus of claim 1, wherein the instructions are further executable by the processor to, in response to a comparison result in which the stability score of the network operating in the first configuration is less than a threshold stability score:
assign a classification to the first configuration of the network, wherein the classification comprises an indication of the first configuration as being unstable; and
add, to the data record, an indication of one or more failure events associated with the first configuration.

11. The apparatus of claim 1, wherein the data record comprises at least one of:
environmental data associated with the one or more first devices;
a configuration tag comprising version information of the first configuration of the network;
a classification associated with the network and the first configuration; and
temporal information associated with the data record.

12. The apparatus of claim 1, wherein the data repository comprises:
a plurality of candidate configurations including the candidate configuration, wherein each of the candidate configurations comprises a network topology; and
a set of data records for generating the plurality of candidate configurations.

13. The apparatus of claim 1, wherein the one or more target parameters comprise at least one of:
a target topology for the network;
a target use case for the network; and
a target stability score for the network.

14. The apparatus of claim 1, wherein the one or more target parameters comprise an extrapolation indicator used to extrapolate at least one of:
a target topology for the network; and
a target use case for the network.

15. The apparatus of claim 1, wherein extrapolating the second configuration comprises extrapolating a topology for the second configuration based on an extrapolation indicator comprised in the one or more target parameters.

16. The apparatus of claim 1, wherein at least one of collecting the configuration data, validating the first configuration of the network, and generating the data record is performed in real-time.

17. The apparatus of claim 1, wherein the instructions are further executable by the processor to:
determine whether the one or more target parameters comprises an extrapolation indicator that indicates the second configuration of the network should be extrapolated; and
extrapolate, when the one or more target parameters comprises the extrapolation indicator, the second configuration of the network from one or more data records from the data repository.

18. A system comprising:
one or more circuits to:
collect configuration data associated with one or more first devices of a network that is operating in a first configuration;
validate the first configuration of the network, wherein validating the first configuration comprises determining a stability status of the network operating in the first configuration;
generate a data record corresponding to the first configuration of the network and store the data record to a data repository of candidate devices and candidate configurations, wherein the data record comprises:
the configuration data associated with the one or more first devices; and
results of validating the first configuration of the network, wherein the results of validating the first configuration of the network include a stability score that identifies the first configuration as either stable or unstable, and wherein the stability score is based on stability parameters which have been filtered to remove errors not induced by the first configuration;
receive a request for a second configuration of the network, wherein the request comprises one or more target parameters for the network;
access, in response to the request, the data repository and determine whether the data repository contains a candidate configuration that matches the one or more target parameters for the network;
select the candidate configuration as the second configuration of the network when the candidate configuration matches the one or more target parameters;
extrapolate, from one or more data records from the data repository, the second configuration of the network when the candidate configuration does not match the one or more target parameters, wherein the second configuration utilizes the one or more first devices, one or more second devices selected from the candidate devices, or both; and
simulate the second configuration of the network.

19. A method of generating a configuration for a simulated network fabric, comprising:
collecting configuration data associated with one or more first devices of a network fabric operating in a first a configuration;
validating the first configuration of the network fabric, wherein validating the configuration comprises determining a stability status of the network fabric operating in the first configuration;
generating a data record corresponding to the first configuration of the network fabric, wherein the data record comprises:
the configuration data associated with the one or more first devices; and
results of validating the first configuration of the network fabric, wherein the results of validating the first configuration of the network fabric include a stability score that identifies the first configuration as either stable or unstable, and wherein the stability score is based on stability parameters which have been filtered to remove errors not induced by the first configuration;
receiving a request for a second configuration of the network fabric, wherein the request comprises one or more target parameters for the network fabric;

accessing, in response to the request, a data repository of candidate configurations and cadidate devices and determining whether the data repository contains a candidate configuration that matches the one or more target parameters for the network fabric;

selecting the candidate configuration as the second configuration of the network fabric when the candidate configuration matches the one or more target parameters;

extrapolating, from one or more data records from the data repository, the second configuration of the network fabric when the candidate configuration does not match the one or more target parameters, wherein the second configuration utilizes the one or more first devices, one or more second devices selected from the candidate devices, or both;

simulating the second configuration of the network fabric; and validating the simulated second configuration of the network fabric based on a result of comparing a stability score associated with the simulated second configuration of the network fabric to a threshold stability score.

\* \* \* \* \*